May 21, 1940. P. M. MILLER ET AL 2,201,445
BRAKE DRUM
Filed Sept. 26, 1931
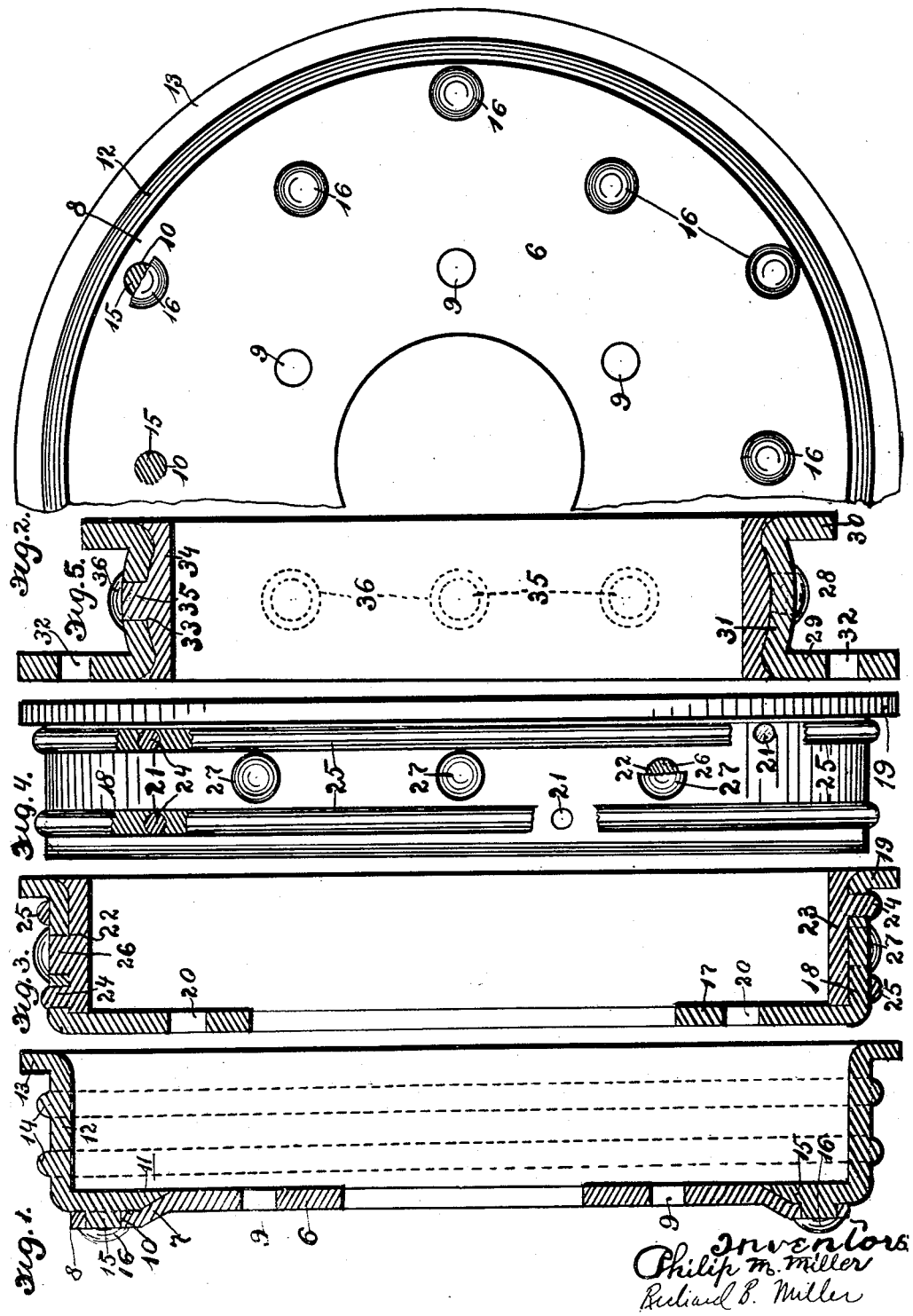
Inventors
Philip M. Miller
Richard P. Miller Patented May 21, 1940

2,201,445

UNITED STATES PATENT OFFICE 2,201,445

BRAKE DRUM

Philip M. Miller and Richard B. Miller, Cleveland, Ohio, assignors to Bendix Aviation Corporation, South Bend, Ind., a corporation of Delaware Application September 26, 1931, Serial No. 565,331

6 Claims. (Cl. 188—218)

Our invention relates to brake drums and particularly to the manufacture thereof, used in connection with light and heavy speedy automotive vehicles and the like equipment. The construction is light, rigid, inexpensive, and durable, provided with a high wear resisting braking member of material harder than the material of the main body thereof, and having heat radiating and resisting means for increasing efficiency therein.

On account of the increased speed of the present motor-driven vehicles and greatly increased traffic, more efficient braking facilities on the vehicles are required than heretofore, and therefore the efficiency of the brake drum must commensurate to the efficiency of the braking mechanism of the vehicle, as the efficiency of one construction depends functionally or structurally on the efficiency of the other construction.

The primary object of the invention is to provide a novel combination of a sheared and rolled drum body of strong sheet material, such as steel, and angle member cast of material harder than the material of the drum body, which angle member and drum body are united together in the process of casting at the foundry operations to form one rigid construction and constitute the brake drum, the angle member having heat radiating and reinforcing means on the outer face thereof.

Another object of the invention is to provide, in modified form, an efficient combination of a sheared drum body of sheet material having a transverse flange merged with an upright flange, and a liner of cast material harder than the material of the sheet material, characterized by the liner material being flown through openings in the transverse flange of the drum body and fused with heat radiating ribs of the same material cast on the outer face thereof, including crown projections formed on the outer face of the transverse flange and fused together with the liner through openings provided in the flange, the cast material of the liner being fed through the openings in the transverse flange to unite both the liner and transverse flange for a rigid engagement therebetween and means of radiating the heat generated therein and reinforcing the construction.

Another object of the invention is to provide, in another modified form, a novel combination comprising a brake drum and liner therefor, characterized by having the brake drum of U-shape in cross section of sheet material, such as steel, rolled to provide parallel engaging flanges and a transverse outwardly concaved body, with a liner of material harder than the material of the brake drum cast in the inner face thereof to provide a high wear resisting braking surface, the material of the liner flowing through openings in the concaved transverse body and fusing with heads formed on the outer face thereof for rigidly uniting both the transverse flange and liner.

The principal object of the invention is to eliminate the detrimental conditions and defects existing with the present brake drums, and to provide a brake drum construction of high efficiency having the main body of sheared rolled steel and the periphery of cast, high wear resisting material adapted to withstand excessive friction caused by contact with braking mechanism of a vehicle. Our improvements in brake drum construction will be best understood by reference to the attached drawing, wherein:

Fig. 1 is a cross section in which the brake engaging angle periphery is of high wear cast material, such as cast iron mixture, having engagement with the outer periphery of a sheared and rolled disk body of sheet metal, such as steel, the material of the angle periphery flowing through openings in the periphery of the disk body and fused with heads cast on the outer face thereof to join the parts for a rigid construction.

Fig. 2 is a fragmentary side elevational view of the brake drum construction shown in Fig. 1, showing the outer face detail construction and parts thereof in section.

Fig. 3 is a cross section in which the disk body is provided with a transverse flange merged with an upright flange, both the disk body and transverse flange with the upright flange being sheared and rolled of sheet material, such as steel, and the liner is of high wear cast material, such as cast iron mixture, having rigid engagement with the inner face of the transverse flange of the brake drum by means of flowing the liner material through openings in the transverse flange and fusing with material cast on the outer face thereof to join the parts for a rigid construction.

Fig. 4 is a developed plan view of the peripheral face of construction shown in Fig. 3, showing parts in section.

Fig. 5 is a cross section in which the brake drum proper is of U-shape in cross section having the transverse body of outwardly concaved shape, the material of which being sheet steel metal sheared and rolled, and the liner is cast in the inner face of the concave body and through openings provided therein by which operation heads are formed on the outer face of the transverse body to join the parts for a rigid construction.

Referring now to Figs. 1 and 2 wherein like numbers refer to corresponding parts, the brake drum body comprises a disk 6 sheared and rolled preferably of strong sheet material, such as steel, in which the periphery is bent by rolling as at 7 to provide continually a peripheral upright portion 8, and openings 9 are provided for engagement with means of a vehicle or a wheel thereof, and openings 10 are formed in the upright peripheral portion 8 for engagement with means of a brake engaging member which will be hereinafter described. To complete the brake drum construction we provide an annular member of angle shape in cross section, comprising a relatively short vertical attaching flange 11, a transverse brake engaging flange 12 merged with an upright backing plate engaging flange 13, and spaced heat radiating and reinforcing ribs 14. The annular member is preferably made of cast iron but it may be substituted by other high wear resisting composition, and as shown may be given great strength owing to the particular construction thereof. As a whole, the angle member is so cast at the foundry operations that the attaching flange 11 is conformed to the inner face of the peripheral portion 8 of the brake drum disk 6 and the material of the attaching flange is flown through the openings 10 in the disk body and shanks 15 are formed of the cast material in the openings 10 and heads 16 of the same cast material are formed on the outer face of the disk periphery 8, thereby rigidly binding both the attaching flange 11 with the periphery of the disk body 6 and providing a complete brake drum construction.

The brake drum construction shown in Figs. 3 and 4, comprises a cylindrical member sheared and rolled preferably of strong sheet material, such as steel, in which the attaching wall is a relatively short vertical flange 17 merged with a transverse flange 18 which is merged with an upright flange 19. Openings 20 are provided in the flange 17 for engagement with locking members in fastening the drum as a whole with means of a vehicle or wheel thereof, while openings 21 and 22 are provided in the transverse flange 18 wherein are formed shanks of material flown outwardly from the cast material of the brake engaging liner 23 molded in the inner face of the transverse flange 18 at the foundry operations, which will hereinafter be described. The liner 23 may be of suitable high wear composition mixture, but in this case it is preferred that the liner is of cast iron mixture. The iron mixture is molded hot in the inner face of the transverse flange 18 in the manner such that the material is flown through the openings 21 and 22 therein to form shanks 24 which are connected with ribs 25 formed of the same material on the outer face of the transverse flange 18, while shanks 26 are formed in the openings of the same cast material and united with heads 27 provided of the same material on the outer face of the transverse flange 18, by which operations the liner is in rigid engagement with the transverse flange. In connection with this construction the provision of the ribs 25 may be excluded in certain brake drum constructions for particular vehicles, and the locking heads 27 alone are to be employed, or vice versa, but in a greater portion of the drums for vehicles both the ribs and heads are to be employed to the advantage of the particular vehicles.

In Fig. 5 a brake drum construction is shown, which comprises an annular seamless member 28 of U-shape in cross section, formed preferably of strong sheet metal, such as steel, by shearing and rolling method. In cross section the rolled annular seamless member 28 comprises an outer vertical wall or rib 29 and an inner parallel wall or rib 30 both merged with an outwardly concaved transverse wall 31, the outer vertical wall being of a diameter greater than the diameter of the inner wall and having openings 32 for engagement with locking members in fastening the brake drum as a whole with means of a vehicle or wheel thereof. Openings 33 are provided in the transverse wall 31, and a liner 34 of suitable mixture, such as cast cylinder iron or the like, is molded in the inner face of the concaved transverse wall 31 in the manner such that the poured hot metal is passed through the openings 33, forming shanks 35 therein, and form heads 36 on the outer face of the transverse wall 31, by which foundry operations the liner is in rigid engagement with the transverse wall thereby completing the construction.

It will now be evident from the foregoing description that the annular cast member 11, 12, 13 and 14 is well adapted to accomplish the objects stated. The cast member includes heat radiating means, resulting in cooler constructions and a decrease in the combined weight of the brake drum as a whole as compared with the conventional brake drum construction required to take care of a given amount of work to be performed. The molding of the cast mixture in and with the outer rolled peripheral portion 8 of the disk member 6 enhances efficiency in providing a rigid engagement between the cast brake engaging member and rolled sheet metal member by flowing the hot cast metal through the openings in the sheet metal member and forming heads on the outer face of the peripheral portion of the disk member, and the parts are upon cooling united to constitute a comparatively light, exceedingly rigid and strong brake drum construction. As the vertical wall 6 is adapted for engagement with means of a vehicle or wheel thereof, the upright flange 13 is adapted for engagement with a member of a braking mechanism to form a telescoped housing therebetween for harboring the parts of the latter.

As the brake drum construction shown in Figs. 1 and 2 will accomplish the objects primarily stated, the brake drum constructions respectively shown in Figs. 3, 4 and 5 are similarly well adapted to accomplish the stated objects. The coincidental features related to the embodiments in the construction shown in Figs. 1 and 2, form inherent features in the constructions shown in Figs. 3, 4 and 5. The molding of the cast mixture in and with the transverse flange 18 and transverse flange 31 of the respective annular, rolled, cylindrical members, enhances efficiency in providing rigid engagement between the cast liners 23 and 34, the material of which flowing through the openings in the respective transverse flanges and fusing with same material on the outer face of flange 18 to form heat radiating and reinforcing means while flowing of the material through openings in flange 31 to form projections thereon, and the parts upon cooling are joined to constitute comparatively light, exceedingly rigid and strong brake drum constructions. The upright flanges 19 and 30 constitute means of engagement with a backing plate of braking mechanisms to form a telescoped housing therebetween wherein the parts of the braking mechanism are harbored. The transverse flange 31, as shown, is of outward concave shape for the purpose of preventing lateral creeping of the liner 34, the material of which is snugly molded in the cavity formed in the inner face thereof, while the shanks 35 and heads 36 are adapted to prevent circumferential creeping therebetween. As is obvious, the inner faces of the transverse flanges 12, 23 and 34 are machined after cooling process at the foundry operations to the required specifications.

While we have shown and described certain features as constituting our invention, it will be understood that parts have been shown for the purpose of illustration only, and that we do not desire to be limited to such details, as obvious modifications, variations and substitutions will occur to a person skilled in the art.

Having thus described our invention, what we claim as new and desire to secure by Letters Patent, is:

1. A brake drum comprising an annular member of rolled sheet metal having a transverse wall and radial walls, said transverse wall being rolled outwardly and provided with openings, an annular member of cast material molded in the inner face thereof and having the material passed through said openings and forming projections on the outer face thereof for fastening the parts together.

2. A brake drum including an annular seamless sheet metal member provided with relatively narrow and relatively deep outwardly projecting annular terminal ribs, and an annular seamless cast metal liner within the member fused thereto and to the ribs thereof.

3. A brake drum including an annular seamless sheet metal member provided with an annular flange having outwardly projecting annular ribs terminating in radial flanges, and an annular seamless cast metal liner fused to the member and to the ribs thereof.

4. A brake drum comprising an annular member having a transverse channeled flange and radial walls, one of said walls comprising means of engagement with means of a vehicle and the other of said walls comprising means adapted for contacting with means of braking mechanism, engaging means in the said transverse channeled flange adapted for engagement of means of a cast metal liner, and a cast metal liner molded and fused in the inner face of the channeled flange so as to form engagement of the material of the cast liner with said engaging means of the transverse channeled flange to hold the channeled flange and cast liner as to prevent creeping therebetween.

5. A brake drum comprising a sheet metal body provided with a radially channeled transverse flange having openings and side walls, at least one of the side walls having openings, and a metal cast liner of material different than the material of the channeled transverse flange circumferentially fastened in the inner face of said channeled transverse flange and extending through the openings in the latter said flange adapted to form projections on the outer face of the channeled transverse flange, the intermediate portions of the liner lying in the openings of the channeled transverse flange and uniting with the portions on the transverse flange to draw said channeled transverse flange into snug engagement with said cast liner, thereby preventing creeping therebetween.

6. A brake drum comprising an annular sheet metal member having radial portions one comprising a brake member contacting flange and the other comprising a wall having openings adapted for locking engagement with a vehicle member, a concave transverse flange integral with said flange and wall and having openings therein, and a cast metal liner in the inner face of the said concave transverse flange and extending through the openings and forming projections on the outer face of the concave transverse flange adapted to draw the sheet metal and cast metal portions together to prevent creeping therebetween.

PHILIP M. MILLER.
RICHARD B. MILLER.